United States Patent [19]

Brilman et al.

[11] Patent Number: 4,663,631

[45] Date of Patent: May 5, 1987

[54] APPARATUS FOR MAINTAINING THE ORIENTATION OF AN ANTENNA SYSTEM WITH RESPECT TO A BEACON

[75] Inventors: Albert Brilman, Holten; Hermanus Gerhardus J. Harbers, Neede, both of Netherlands

[73] Assignee: Hollandse Signaalapparaten B.V., Hengelo, Netherlands

[21] Appl. No.: 769,101

[22] Filed: Aug. 26, 1985

[30] Foreign Application Priority Data

Sep. 12, 1984 [NL] Netherlands ............ 8402781

[51] Int. Cl.⁴ ................................ G01S 5/02
[52] U.S. Cl. .................... 342/422; 342/427
[58] Field of Search ............... 343/422, 427, 359, 420, 343/16 M; 342/149–154

[56] References Cited

U.S. PATENT DOCUMENTS 3,340,532 9/1967 Glomb et al. .
3,560,974 2/1971 Lecourtier et al. ............. 343/16 M
3,893,116 7/1975 Hudspeth et al. ............. 343/16 M

FOREIGN PATENT DOCUMENTS 2408843 8/1979 France .

OTHER PUBLICATIONS

Surenian, "Shipboard Satellite Communications Terminal AN/WSC-2", Elec. Comm., vol. 49, No. 3, 1974, pp. 227–239.

*Primary Examiner*—Theodore M. Blum
*Assistant Examiner*—Gregory C. Issing
*Attorney, Agent, or Firm*—Robert J. Kraus

[57] ABSTRACT

In an apparatus for maintaining the orientation of an antenna system with respect to a beacon, radio signals are received in four quadrants and converted into sum and difference signals, which are transformed in frequency, amplified in an amplifier (6) and detected in a first- and second-phase detector (9, 15) present in a corresponding channel (7, 8) to derive error voltages in first and second time intervals respectively for aligning the antenna system with respect to the beacon. During the tracking mode of the apparatus, the difference and sum signals separately pass in first, second and third, fourth time intervals, respectively. a VCO (21) supplies two orthogonal signals as reference voltages, to the phase detectors. In the tracking mode the VCO driven by a signal derived from the signals obtained in the first channel (7) in the fourth time interval and in the second channel (8) in the third time interval. With a gain control circuit (27) the gain of the amplifier (6) is adjusted in response to signals obtained in the first and the second channels (7, 8) in the said third and fourth time intervals respectively in such a way that the output voltage of the first phase detector (9) in the third and first time interval and that of the second phase detector (15) in the fourth and second time interval are kept constant.

9 Claims, 3 Drawing Figures

APPARATUS FOR MAINTAINING THE ORIENTATION OF AN ANTENNA SYSTEM WITH RESPECT TO A BEACON

BACKGROUND OF THE INVENTION

The present invention relates to an apparatus for maintaining the orientation of an antenna system with respect to a beacon. The apparatus includes a monopulse cluster for receiving radio signals in four quadrants and converting the signals into sum and difference signals $\Sigma x$, $\Sigma y$ and $\Delta x$, $\Delta y$ respectively. It further includes transforming means for transforming the sum and difference signals to the intermediate frequency, amplifying and phase detecting said sum and difference signals to derive the error voltages $f\Delta x$, $f\Delta y$ from the then obtained signals to align the antenna system with a position determined by the beacon. The sum and difference signals are defined in the conventional way with respect to an x,y coordinate system in a plane perpendicular to the axis between the antenna system and the beacon.

With the direct transmission of television programs via satellites, the antennas mounted on a satellite have to be optimally directed to the target area concerned. As a satellite, even in a geostationary orbit, performs small movements relative to the earth, this target area will have to be tracked, as it were, constantly. For this purpose, a beacon ground station is used, emitting a high-frequency tracking signal, preferably a continuous signal. In such a case, the relevant angle tracking data is obtainable in the satellite by the application of the monopulse principle; the received signals provide the sum and difference signals $\Sigma x$, $\Sigma y$ and $\Delta x$, $\Delta y$, respectively.

The beacon may be so arranged that the target area concerned is covered by aligning the antennas with the beacon; in such a case, the $\Delta x$, $\Delta y$ difference signals will be zero. Geographic conditions, however, may require to position the beacon away from the central position. In this case, the antennas must be aligned with the beacon at fixed angles with respect to the axis between satellite and beacon; one or both $\Delta x$, $\Delta y$ difference signals will then differ from zero. To be able to derive the relevant angular data from the received signals of the beacon in the satellite, in-phase coherent detection should be possible. If the transmitter and the receiver are positioned together, the received signals are detected by utilising, amongst others, a signal aligned in phase with the transmission signal. Such a signal however is not available here, as the beacon and the satellite are far apart.

SUMMARY OF THE INVENTION

The present invention has for its object to provide an apparatus of the type set forth in the opening paragraph and installed preferably in a satellite to keep a television antenna system, mounted on the satellite, permanently directed at a beacon or at the earth surface at a point defined with respect to this beacon. According to the invention, the apparatus cited in the opening paragraph is characterised in that switching means are incorporated for passing the sum and difference signals received from the monopulse cluster separately to the transforming means in predetermined time intervals $T\Sigma x$, $T\Delta x$, $T\Sigma y$, $T\Delta y$ during a tracking mode of the apparatus, that said transforming means comprises one intermediate frequency amplifier and, connected thereto, a first and a second channel for supplying the error voltages $f\Delta x$ and $f\Delta t$ in time intervals $T\Delta x$ and $T\Delta y$, respectively. The first channel includes a first phase detector and the second channel a second phase detector. The apparatus further comprises a voltage-controlled oscillator for supplying two mutually orthogonal signals to serve as reference voltage for the phase detectors, which voltage-controlled oscillator is driven in the tracking mode by a signal derived from the signals obtained in the first channel in time interval $T\Sigma y$ and in the second channel in time interval $T\Sigma x$. It also includes a first gain control circuit for adjusting in the tracking mode, in response to the signals obtained in the first and the second channels in time intervals $T\Sigma x$ and $T\Sigma y$, respectively, the gain of the intermediate frequency amplifier in such a way that the output voltage of the first phase detector in time intervals $T\Sigma x$, $T\Delta x$ and that of the second phase detector in time intervals $T\Sigma y$, $T\Delta y$ are kept constant.

The two phase detectors fulfil two functions. On the one hand, they effect a coherent detection to obtain the error voltages $f\Delta x$ and $f\Delta y$, using the output signals of the voltage-controlled oscillator; on the other hand they function as phase-sensitive detectors for correct tuning of the voltage-controlled oscillator in a phase-locked loop. According to the invention, an integrator is specially incorporated for supplying the tuning voltage for the voltage-controlled oscillator during the tracking mode in response to the signals obtained in the first channel in time interval $T\Sigma y$ and in the second channel in time interval $T\Sigma x$. In this way the voltage-controlled oscillator is continuously aligned with the average value of the i.f.-transformed, amplified and phase-detected sum signals $\Sigma x$ and $\Sigma y$. This however requires that the output voltage for the first phase detector be kept constant at least in time intervals $T\Sigma x$ and that of the second phase detector at least in time interval $T\Sigma y$. This method of alignment of the voltage-controlled oscillator however cannot be achieved until the oscillator has been tuned in some degree to the signal supplied to the phase detectors. Hence, according to the invention, the alignment circuit is incorporated for aligning during an acquisition mode of the apparatus, in response to one of the signals received from the monopulse cluster and supplied via one of the two channels, the voltage-controlled oscillator in frequency and in phase with the signal supplied to the phase detectors, while the measure in which the alignment process has taken place is dictated by a signal supplied via the other channel. That is, in the acquisition mode the voltage-controlled oscillator is in the first instance adjusted and further adjusted to obtain optimum alignment of this oscillator.

BRIEF DESCRIPTION OF THE DRAWING

The invention and further characteristics and advantages thereof will now be described with reference to the accompanying figures, of which.

DESCRIPTION OF THE PREFERRED EMBODIMENT

Figure 1:
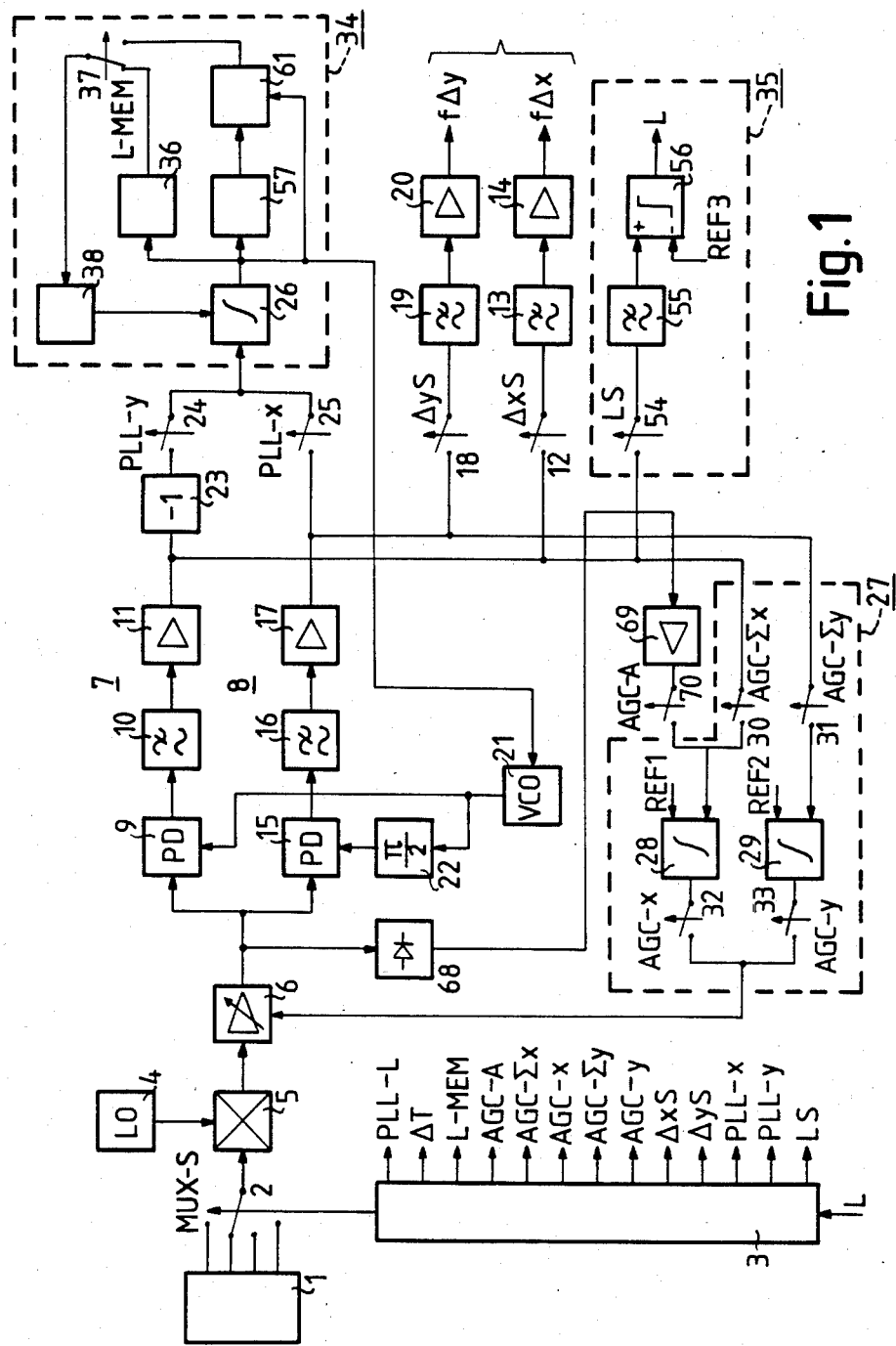
FIG. 1 is a block diagram of the apparatus according to the invention.

The apparatus illustrated in FIG. 1 comprises a monopulse cluster 1 to receive radio signals in four quadrants and to convert these into sum and difference signals $\Sigma x$, $\Sigma y$ and $\Delta x$, $\Delta y$, respectively. Switching means 2 passes these signals, at least during the tracking mode, in predetermined time intervals $T\Sigma x$, $T\Sigma x$, $T\Sigma y$, $T\Delta y$. The signals are preferably continuous, whereby switching means 2 passes samples of the signals $\Sigma x$, $\Delta x$, $\Sigma y$ and $\Delta y$ in succession. The signals may also be passed in different sequences. In the event of pulse-shaped signals, these signals should be subjected to various delays to obtain a defined sequence; a precise setting of the delays is however difficult to realise for the high frequency of the signals. In the acquisition mode, only one of the signals is passed, preferably a sum signal, e.g. $\Sigma x$. The timing signal MUX-S for switching means 2 is supplied by a timing unit 3.

Figure 3:
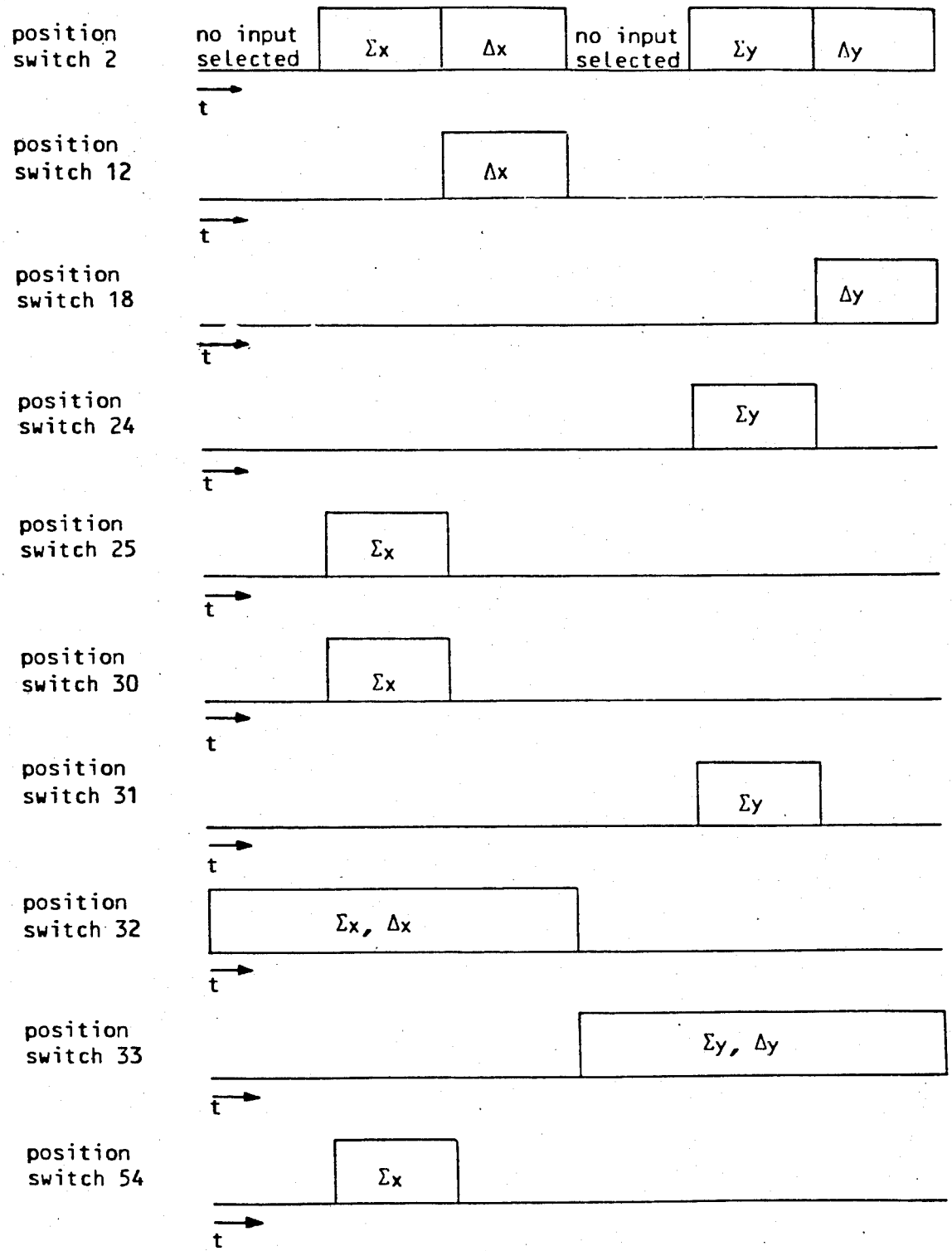
FIG. 3 is a timing diagram showing the positions of switches in the apparatus as a fuction of time.

This and other switch-timing signals supplied by the timing unit are illustrated in FIG. 3. A signal from an oscillator 4 is used to transform the passed signals to the intermediate frequency in mixer 5. The signals transformed to the intermediate frequency are amplified in the variable intermediate-frequency amplifier 6 and supplied to a first channel 7 and a second channel 8. The first channel 7 comprises a first phase detector 9, a filter 10, an amplifier 11, a switch 12, a filter 13, and an amplifier 14. The second channel 8 comprises a second phase detector 15, a filter 16, an amplifier 17, a switch 18, a filter 19, and an amplifier 20. The apparatus is further provided with a voltage-controlled oscillator 21 to produce, with the aid of the 90° phase shifter 22, two mutually orthogonal signals, used as reference volage for the phase detector 9 and 15. If switch 12 is closed through signal $\Delta xS$ from timing unit 3, as occurring in a time interval $T\Delta x$, the difference signal $\Delta x$ i.f.-transformed, amplified and coherently detected in the first phase detector 9 provides an error voltage $f\Delta x$ in the first channel 7, assuming that the voltage-controlled oscillator 21 is in the aligned state. If switch 18 is closed through signal $\Delta yS$ from timing unit 3, as occurring in a time interval $T\Delta y$, the difference signal $\Delta y$, i.f.-transformed, amplified and coherently detected in the second phase detector 15, provides an error voltage $f\Delta y$, again assuming that the voltage-controlled oscillator 21 is in the aligned state. In time intervals $T\Delta x$ and $T\Delta y$ the phase detectors 9 and 15 should be in the tracking mode for coherent detection to otain the error voltages $f\Delta x$ and $f\Delta y$, respectively.

In time intervals $T\Sigma x$ and $T\Sigma y$ the phase detector 9 and 15 fulfil the function of phase detector in a phase-locked loop. The input signals of the phase-locked loop are constituted by the i.f.-transformed and amplified signals $\Sigma x'$ and $\Sigma y'$, respectively, from the monopulse cluster, where $\Sigma x' = A \cos(\omega t + \alpha + \tfrac{1}{2}\phi)$ $\Sigma y' = B \sin(\omega t + \alpha - \tfrac{1}{2}\phi)$ and the output signal of the voltage-controlled oscillator is represented by: $U_{VCO} = C \cos \omega t$, where $\alpha$ represents the common phase error of input signals $\Sigma x'$ and $\Sigma y'$ with respect to the output signal $V_{VCO}$ of the voltage-controlled oscillator and $\phi$ the phase error being due to the depolarisation in the radiation path between the earth surface and the sattelite; for $\phi$, $|\phi| < 1/6$ rad.

In time interval $T\Sigma x$ the phase detector 9 provides the signal $K.A. \cos(\omega t + \alpha + \tfrac{1}{2}\phi).C \cos \omega t$. After filtering and amplification in units 10 and 11, respectively, and after inversion in inverter 23 the latter signal can be expressed by: $-K_{dx} \cos(\alpha + \tfrac{1}{2}\phi)$. In time interval $T\Sigma x$ the phase detector 15 produces the signal $K.A. \cos(\omega t + \alpha + \tfrac{1}{2}\phi).C \sin \omega t$. After filtering and amplification in units 16 and 17, respectively, this signal can be expressed by: $-K_{dx} \sin(\alpha + \tfrac{1}{2}\phi)$.

In time interval $T\Sigma y$ the phase detector 9 produces the signal $K.B. \sin(\omega t + \alpha - \tfrac{1}{2}\phi).C \cos \omega t$. After filtering, amplification and inversion in units 10, 11 and 23, respectively, this signal can be expressed by: $-K_{dy} \sin(\alpha - \tfrac{1}{2}\phi)$. In time interval $T\Sigma y$ the phase detector 15 produces the signal $K.B. \cos(\omega t + \alpha - \tfrac{1}{2}\phi).C \sin \omega t$. After filtering and amplification in units 16 and 17, respectively, this signal can be expressed by: $K_{dy} \cos(\alpha - \tfrac{1}{2}\phi)$. A switch 24 is connected to inverter 23. This switch closes in time interval $T\Sigma y$ on the reception of a control signal PLL-y from the timing unit 3. A switch 25 is connected to amplifier 17; switch 25 closes in time interval $T\Sigma x$ on the reception of a control signal PLL-x from timing unit 3. The apparatus further comprises an integrator 26, which is supplied with signal $-K_{dy} \sin(\alpha - \tfrac{1}{2}\phi)$ from switch 24 in time interval $T\Sigma y$ and signal $-K_{dx} \sin(\alpha + \tfrac{1}{2}\phi)$ from switch 25 in time interval $T\Sigma x$. If $T_o = T\Sigma x + T\Sigma y$ and $T = T\Sigma x + T\Delta x + T\Sigma y + T\Delta y$, such that $T_o/T$ represents the duty cycle of integrator 26, the input signal of integrator 26 averaged over time T can be expressed by: $-T_o/T[K_{dx} \sin(\alpha + \tfrac{1}{2}\phi) + K_{dy} \sin(\alpha - \tfrac{1}{2}\phi)]$, or for small values of $(\alpha - \tfrac{1}{2})$, by: $-T_o/T[(K_{dx} + K_{dy})\alpha + (K_{dx} - K_{dy})\tfrac{1}{2}\phi]$.

As will be described below, the gain factor of i.f. amplifier 6 is so adjusted that the output voltage of the first phase detector 9 is kept constant at least in tiime interval $T\Sigma x$ and that of the second phase detector 15 at least in time interval $T\Sigma y$, so that $K_{dx} = K_{dy} = K_d$. The input signal of integrator 26 averaged over time T can thus be expressed by: $-2K_d T_o/T . \alpha = C.\alpha$, where C is a constant. Integrator 26 supplies the tuning voltage for voltage-controlled oscillator 21. As soon as this oscillator is fully aligned with input signals $\Sigma x'$ and $\Sigma y'$, $\alpha = 0$ and hence the integrator input voltage averaged over time T as well.

After complete alignment of voltage-controlled oscillator 21, signal $K_{dx} \cos(\alpha + \tfrac{1}{2}\phi)$ produced by amplifier 11 in time interval $T\Sigma x$ and signal $K_{dy} \cos(\alpha - \tfrac{1}{2}\phi)$ produced by amplifier 17 in time interval $T\Sigma y$ can be expressed by: $K_{dx} \cos \tfrac{1}{2}\phi$ and $K_{dy} \cos \tfrac{1}{2}\phi$, respectively, and are used as input signals for the first gain control circuit 27. These signals are therefore a maximum when the control signals for the phase-locked loop are a minimum.

The first gain control circuit 27 comprises two integrators 28 and 29 and two switches 30 and 31, controlled by the control signals AGC-$\Sigma x$ and AGC-$\Sigma y$ from timing unit 3. In time interval $T\Sigma x$ the signal $K_{dx} \cos \tfrac{1}{2}\phi$ is applied to integrator 28 via switch 30. In time interval $T\Sigma y$ the signal $K_{dy} \cos \tfrac{1}{2}\phi$ is supplied to integrator 29 via switch 31. For reasons of simplicity it is assumed that $\alpha = 0$ and voltage-controlled oscillator 21 is therefore tuned correctly. The first control circuit further comprises two switches 32 and 33 controlled by control signals AGC-x and AGC-y from timing unit 3. These switches are used to set the time intervals in which the output signal of integrators 28 and 29 function as control voltage for the variable i.f. amplifier 6. The gain factor of this amplifier is so adjusted that the output voltage of phase detector 9 is kept constant at least in time interval TΣx, but preferably in time intervals TΣx, TΔx and that of the second phase detector 15 at least in time interval TΣy, but preferably in time intervals TΣy, TΔy. The purpose of an adjustment in time intervals TΣx and TΣy is to equate values $K_{dx}$ and $K_{dy}$ in the phase-locked loop. The setting obtained in these time intervals is however to be maintained in time intervals TΔx and TΔt, when the difference signals at the output of i.f. amplifier 6 are normalised by the sum signals via the gain control circuit. The difference signals at the output of i.f. amplifier 6 are therefore in direct relationship with the angular errors in the orientation of the satellite with respect to the beacon, irrespective of the strength of the received signals. Hence, the output voltage of integrator 28 functions as control signal for amplifier 6 in time intervals TΣx, TΔx and the output voltage of integrator 29 in time intervals TΣy, TΔy.

The two integrators 28 and 29 also receive a reference voltage REF1 and REF2, respectively, where REF1=REF2, as the control circuit remains active until the input voltage of integrators 28 and 29 is zero.

In the phase-locked loop described above, it is shown how the voltage-controlled oscillator 21 is aligned with input signals Σx' and Σy' of phase detectors 9 and 15. This alignment process is however effective only if the voltage-controlled oscillator 21 has been aligned to some measure with these signals. The latter is realised with the aid of an alignment circuit 34 to align, during an acquisition mode of the apparatus, in response to one of the signals received from the monopulse cluster and supplied via one of the two channels, the voltage-controlled oscillator 21 in frequency and in phase with the signal applied to phase detectors 9 and 15, the measure of the alignment process being dictated by a signal supplied via the other channel. During acquisition the switching means 2 is kept connected to one of the two outputs of the monopulse cluster, for example to the output via which the Σx signal is supplied. The reason thereof is that during acquisition it is avoided that switching means 2 be activated as this would introduce new frequencies to which the voltage-controlled oscillator is prone to lock. The two phase detectors 9 and 15 are then fed with signal Σx' received from the monopulse cluster, i.f.-transformed and amplified. In the second channel 8, during time interval TΣx, the Σx' signal is to provide the signal functioning as input signal for the alignment circuit 34, in particlar as input signal for integrator 26 forming part of the alignment circuit. In the first channel 7, during time interval TΣx, this is to provide the signal functioning as input signal for circuit 35 to indicate the measure of alignment of the voltage-controlled oscillator 21 with the Σx' signal.

Figure 2:
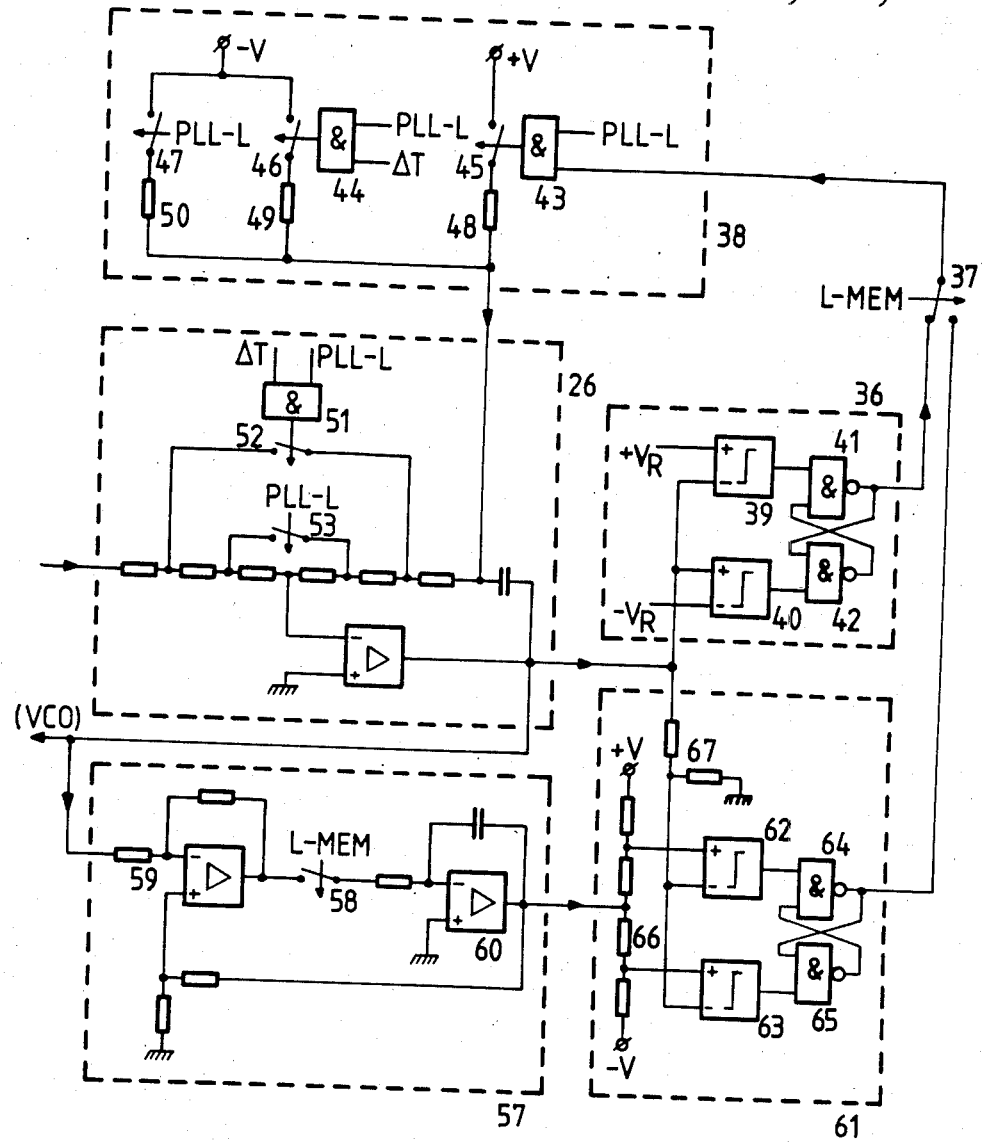
FIG. 2 is a more detailed diagram of the alignment circuit incorporated in the apparatus according to the invention.

The alignment circuit comprises a first control circuit including the above-described integrator 26 connected to the second channel 8 during acquisition, a first comparator circuit 36, a switch 37, and a resistance-setting circuit 38. The alignment circuit is shown in detail in FIG. 2. Comparator circuit 36 here comprises two comparators 39 and 40 and two logic circuits, for example NAND circuits 41 and 42 which are interconnected as shown in FIG. 2; during acquisition the comparator circuit 36 causes the integrator 26 to supply a signal varying about linearly between two values +$V_R$ and −$V_R$, which signal is used as input voltage for the voltage-controlled oscillator. Switch 37 is controlled by a signal L-MEM from timing out 3 and is in the position as shown in FIG. 2. The rate at which the above complete scanning can be executed, or the frequency of the complete scan is set in resistance-setting circuit 38. Circuit 38 consists of two logic circuits, for example AND circuits 43 and 44, three switches 45, 46 and 47 and three resistances 48, 49 and 50. The signal from comparator circuit 36 is applied to AND circuit 43 via switch 37. During acquisition, when the timing unit 3 supplies a control signal PLL-L indicative of the acquisition mode, this signal causes switch 45 to close in order to determine the slope of the flyback of the signal varying linearly between values +$V_R$ and −$V_R$. Control signal PLL-L causes switch 47 or switches 46 and 47 to close in order that resistance 50 or resistances 49 and 50 determine the slope of the scan of the signal varying linearly between values +$V_R$ and −$V_R$. Signal ΔT from timing unit 3 ensures that in a first phase of the acquisition mode the scan proceeds at a higher rate than in the remaining time, thus in the second phase of the acquisition mode. The bandwidth setting of integrator 26 is accomplished in concurrence with these two phases of the acquisition mode; for this purpose integrator 26 comprises a logic circuit, for example an AND circuit 51 and two switches 52 and 53, controlled in the same way as switches 46 and 47 in resistance setting circuit 38. The voltage scan performed by integrator 26 in the acquisition mode causes a frequency scan in the voltage-controlled oscillator 21. The scans succeed each other until the voltage-controlled oscillator 21 is locked to the Σx' signal, so that the input voltage of integrator 26 goes to zero. In this case, the signal supplied by amplifier 11 in the first channel 7 will be a maximum. This signal is applied to circuit 35 consisting of a switch 54, a filter 55 and a comparator 56. The signal supplied by amplifier 11 in the first channel is applied to comparator 56 via switch 54 and filter 55, where it is compared with a reference voltage REF3. If the supplied signal exceeds this reference signal, the voltage-controlled oscillator 21 is sufficiently aligned with the Σx' signal and comparator 56 produces a signal L, applied to timing unit 3 to switch from the acquisition to the tracking mode. Switch 54 is controlled by a signal LS from timing unit 3.

Even when the apparatus is in the tracking mode, it may happen that the voltage-controlled oscillator gets detuned, that it is no longer locked to the Σx' signal, and that therefore it has lost the target. Although in such a case the acquisition mode could be reselected, it is possible to relock the voltage-controlled oscillator rapidly to the Σx' signal, much more rapidly than in the acquisition mode. The apparatus then switches to a re-acquisition mode. For this purpose the alignment circuit 34 comprises a memory cell 57 for storing in the tracking mode the integrator output signal obtained in the acquisition mode, which signal corresponds with the voltage-controlled oscillator output signal aligned with phase detectors 9 and 15 in frequency and in phase. That is, the correct tuning voltage for voltage-controlled oscillator 21, as obtained in the acquisition mode, is stored in the subsequent tracking mode. Writing into memory cell 57 is achieved through a switch 58 controlled by a signal L-MEM from timing unit 3. Memory cell 57 conventionally consists of an inverter 59 for receiving the output signal of integrator 26, and an integrator 60 whose output signal is coupled to inverter 59 with a negative feedback. Alignment circuit 34 further comprises a second control circuit which is formed by integrator 26, memory cell 57, a second comparator circuit 61, switch 37 and resistance setting circuit 38. Comparator circuit 61 consists of comparators 62 and 63, logic circuits, for example NAND circuits 64 and 65, and a voltage divider 66; these components are interconnected as shown in FIG. 2. The outer signal of integrator 26 is applied as input signal to comparator circuit 61 via a voltage divider 67, as well as to comparator circuit 36, while the tuning voltage stored in memory 57 for voltage-controlled oscillator 21 and voltage divider 66 dictate the reference voltage for comparators 62 and 63. The second control circuit is closed by signal L-MEM by setting switch 37 in the position not shown in FIG. 2. The operating principle of the second control circuit is the same as that of the first control circuit. Here, in the re-acquisition mode, the comparator circuit 61 achieves that integrator 26 supplies a signal varying about linearly between two values stored in memory 57 and defining a limited scan, which signal is utilised as input voltage for the voltage-controlled oscillator. The limited scan is therefore executed in a small voltage interval about the memory-stored tuning voltage. If the voltage-controlled oscillator 21 loses the target in the tracking mode, the voltage-controlled oscillator will be detuned to a slight extent only, and a limited scan about the set tuning voltage will suffice.

The apparatus further comprises a second gain control circuit, active in the acquisition and the re-acquisition modes. In these modes it is to be prevented that the received signal be displaced by strong noise, as the i.f. amplifier 6 reached the saturation point. The second gain control circuit is constituted by detector 68 connected to i.f. amplifier 6, and amplifier 69, a switch 70, integrator 28 and switch 32. Switch 70 is closed by the AGC-A control signal from timing unit 3, namely in the acquisition and re-acquisition modes. Switch 32 is not only closed in time intervals $T\Sigma x$, $T\Delta x$ in the tracking mode, but also in the acquisition and re-acquisition modes. The AGC-x control signal therefore fulfils a double function.

We claim:

1. An apparatus for determining the orientation of an antenna system with respect to a beacon, said apparatus including:
   (a) a monopulse cluster for receiving radio signals in four quadrants and converting the signals into sum and difference signals;
   (b) transforming means, including an intermediate frequency amplifier for transforming the sum and difference signals to an intermediate frequency, and amplifying and phase detecting the intermediate-frequency transformed signals to derive error voltages for determining the position of the antenna system relative to the beacon position;
   (c) switching means for selectively coupling the sum and difference signals to the transforming means;
   (d) a voltage-controlled oscillator; and
   (e) means for controlling the gain of the intermediate frequency amplifier;
   characterized in that the sum and difference signals are designated $\Sigma x$, $\Sigma y$ and $\Delta x$, $\Delta y$, respectively, said apparatus including timing means for controlling the switching means to effect coupling of said sum and difference signals to the transforming means in predefined time intervals $T\Sigma x$, $T\Delta x$, $T\Sigma y$ $T\Delta y$ during a tracking mode of the apparatus, said transforming means further comprising a first and a second channel connected to said intermediate frequency amplifier for supplying error voltages, $f\Delta x$ and $f\Delta y$, in time intervals $T\Delta x$ and $t\Delta y$, respectively, said first channel including a first phase detector and said second channel a second phase detector, said voltage-controlled oscillator supplying two mutually-orthogonal signals to serve as reference voltages for said first and second phase detectors, said voltage-controlled oscillator being driven in the tracking mode by a signal derived from the signals obtained in the first channel in time time interval $T\Sigma y$ and in the second channel in time interval $T\Sigma x$; and said means for controlling the gain of the intermediate frequency amplifier comprising a first gain control circuit for adjusting in the tracking mode, in ressponse to the signals obtained in the first and the second channels in time intervals $T\Sigma x$ and $T\Sigma y$, respectively, the gain of the intermediate frequency amplifier in such a way that the output voltage of the first phase detector in time intervals $T\Sigma x$ and $T\Delta x$ and that of the second phase detector in time intervals $T\Sigma y$, $T\Delta y$ are kept constant.

2. An apparatus as claimed in claim 1, including an integrator for supplying the tuning voltage to the voltage-controlled oscillator, during the tracking mode the integrator operating in response to the signals received in the first channel in time interval $T\Sigma y$ and in the second channel in time interval $T\Sigma x$.

3. An apparatus as claimed in claim 1, where the means for controlling the gain includes:
   (a) a first integrator for supplying, in the tracking mode in time intervals $T\Sigma x$, $T\Delta x$, a voltage for controlling the gain of the intermediate-frequency amplifier in response to the signals received in the first channel in time intervals $T\Sigma x$; and
   (b) a second integrator for supplying, in the tracking mode in time intervals $T\Sigma y$, $T\Delta y$, a voltage for controlling the gain of the intermediate-frequency amplifier in response to the signals received in the second channel in time intervals $T\Sigma y$.

4. An apparatus as claimed in claim 1, including an alignment circuit for aligning, during an acquisition mode of the apparatus, in response to one of the signals received from the monopulse cluster and supplied via one of the two channels, the voltage-controlled oscillator in frequency and in phase with the signal supplied to the phase detectors, while the measure in which the alignment process has taken place is dictated by a signal supplied via the other channel.

5. An apparatus as claimed in claim 4, characterised in that the alignment circuit comprises a first control circuit including an integrator, connected to one of the two channels in the acquisition mode, and a first comparator circuit to obtain from the integrator during the acquisition mode a signal varying about linearly between two values and defining a complete scan, which signal is utilised as input voltage for the voltage-controlled oscillator.

6. An apparatus as claimed in claim 5, characterised in that the alignment circuit comprises a storage cell for storing during the tracking mode the integrator output signal that is obtained in the acquisition mode and that corresponds with the voltage-controlled oscillator output signal aligned in frequency and in phase with the signal supplied to the phase detectors.

7. An apparatus as claimed in claim 6, characterised in that the alignment circuit comprises a second control circuit also including said integrator and said storage cell, and a second comparator circuit to obtain from the integrator during a re-acquisition mode of the apparatus a signal varying linearly between two values stored in the storage cell and defining a limited scan, which signal is utilised as an input voltage for the voltage-controlled oscillator.

8. An apparatus as claimed in claim 7, characterised in that the two control circuits comprise a resistance-setting circuit for determining the frequency of the complete and the limited scans, respectively.

9. An apparatus as claimed in claim 4, characterised in that a second gain control circuit is incorporated to be active only if the apparatus is not in the target tracking mode.

* * * * *